Aug. 11, 1953     T. R. BLACK     2,648,423
ENDLESS BELT CONVEYER
Filed April 16, 1949     4 Sheets-Sheet 1
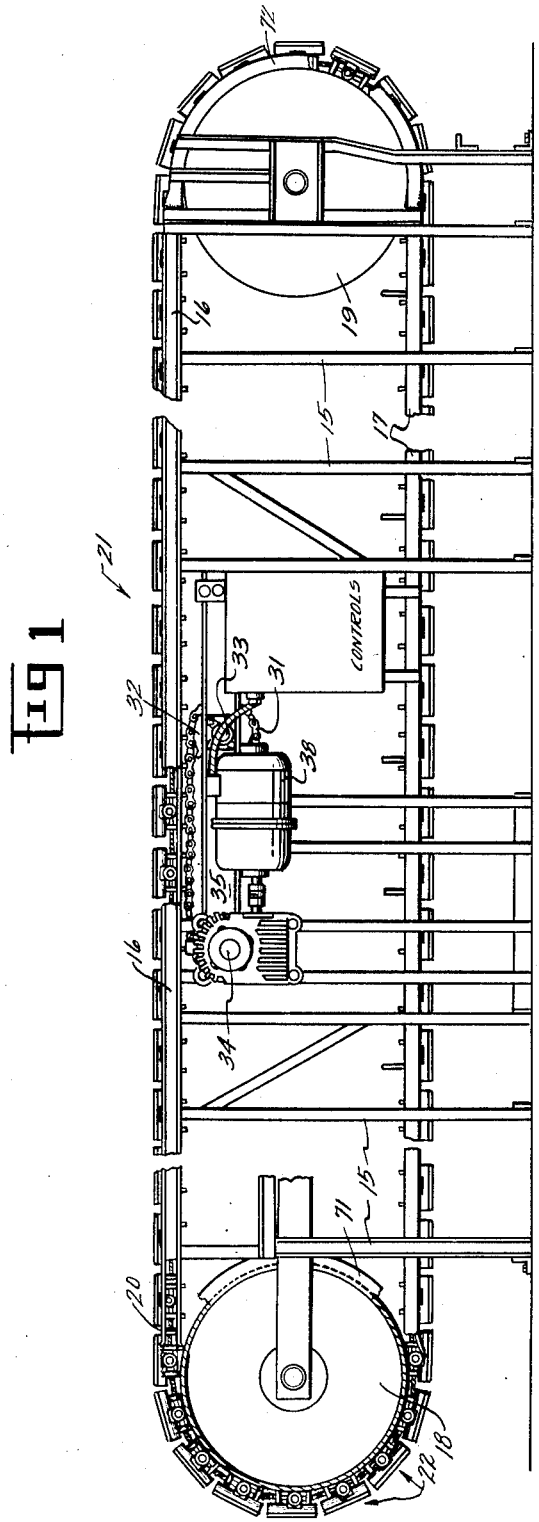
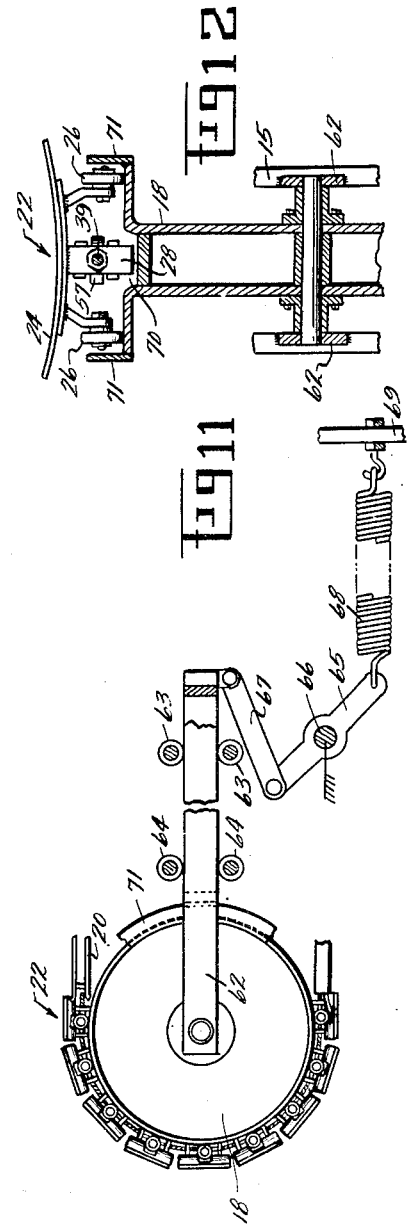
INVENTOR.
THEODORE R. BLACK
BY
ATTORNEY—

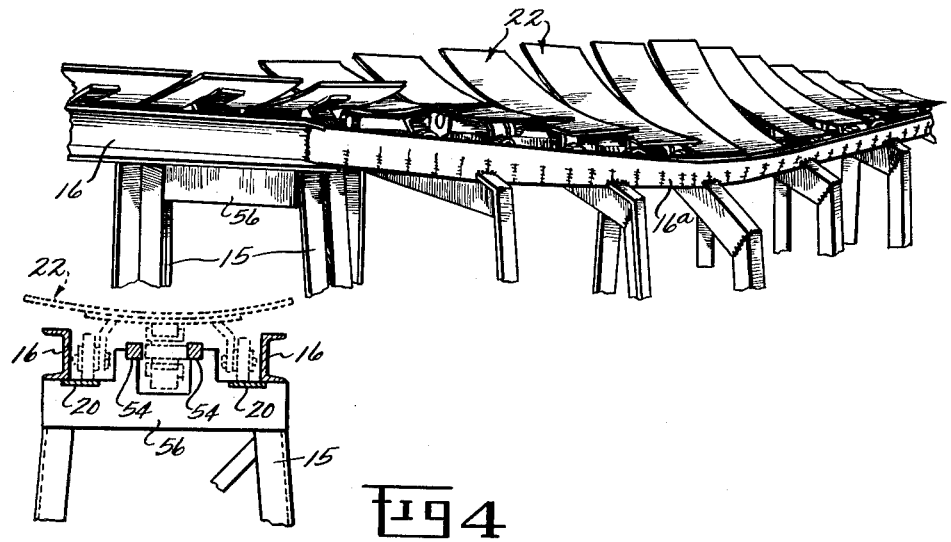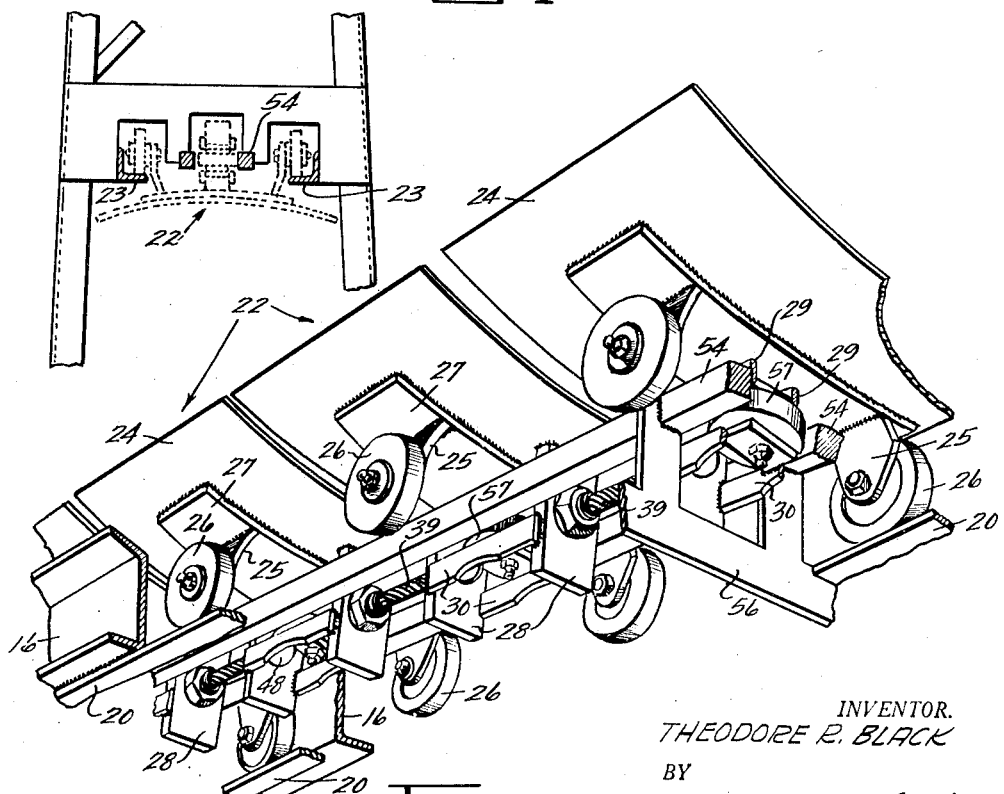

Aug. 11, 1953  T. R. BLACK  2,648,423
ENDLESS BELT CONVEYER
Filed April 16, 1949  4 Sheets-Sheet 3
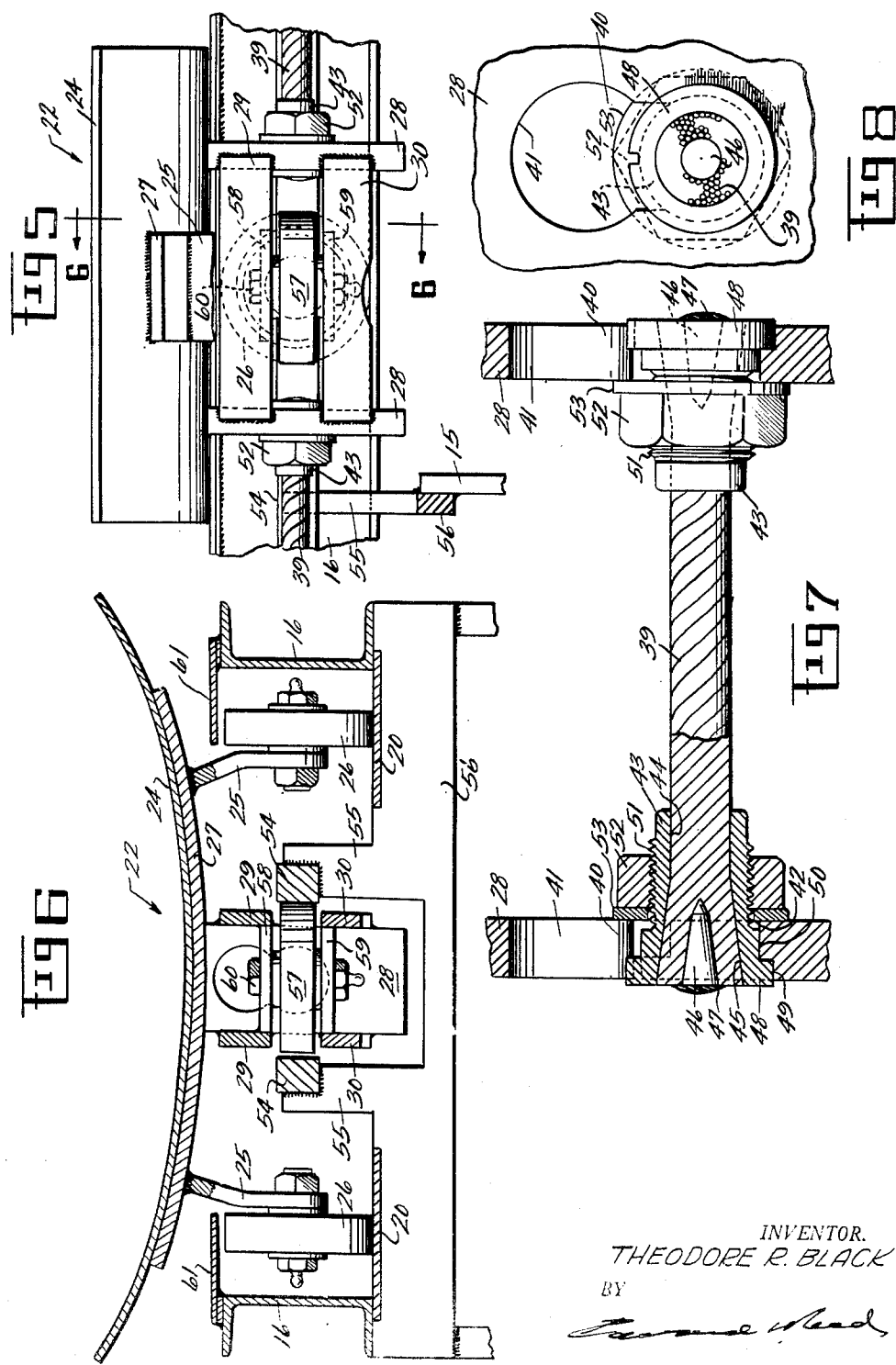
INVENTOR.
THEODORE R. BLACK
BY
ATTORNEY Aug. 11, 1953 — T. R. BLACK — 2,648,423
ENDLESS BELT CONVEYER
Filed April 16, 1949 — 4 Sheets-Sheet 4
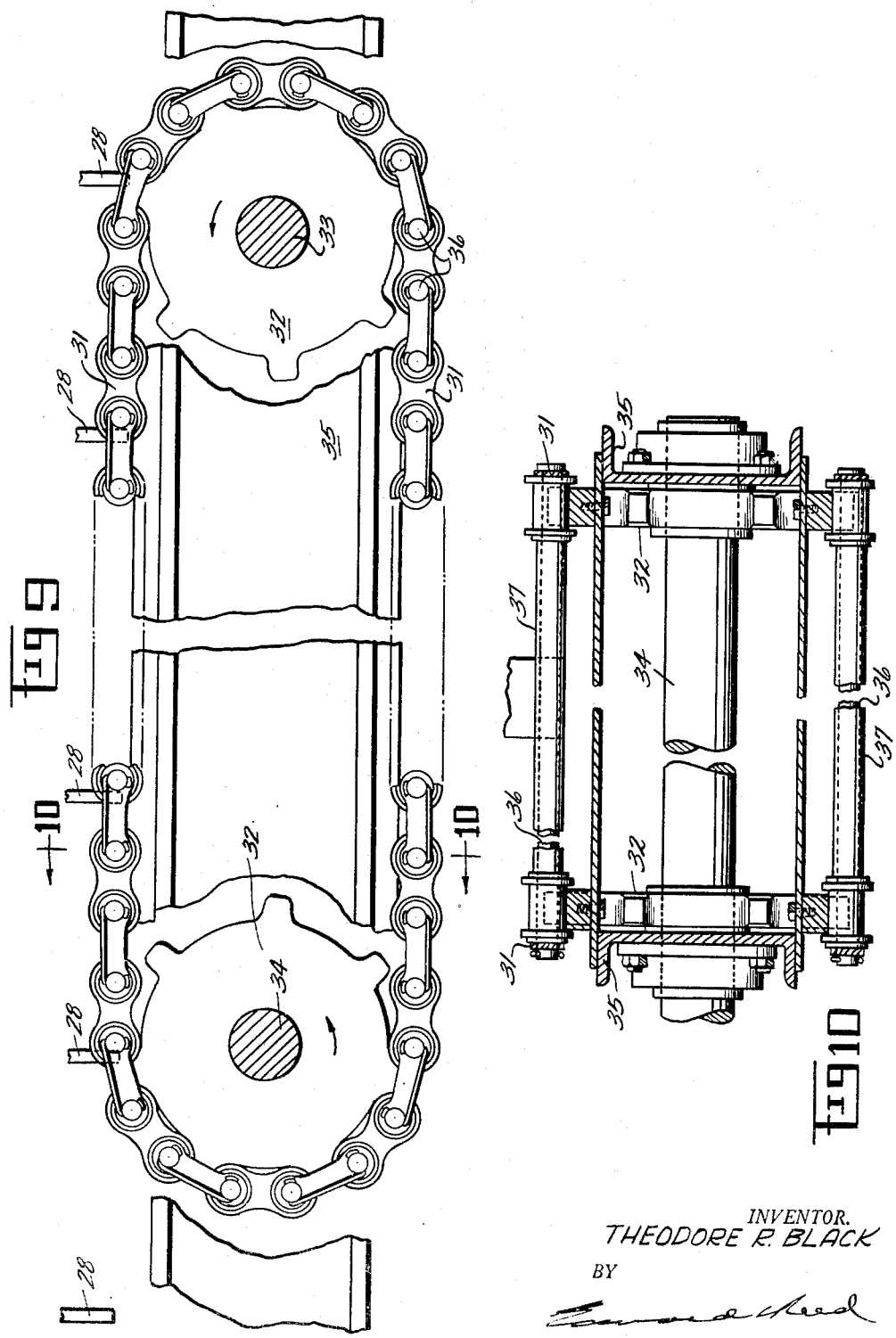
INVENTOR.
THEODORE R. BLACK
BY
ATTORNEY—

Patented Aug. 11, 1953

2,648,423

UNITED STATES PATENT OFFICE 2,648,423

ENDLESS BELT CONVEYER

Theodore R. Black, Tipp City, Ohio

Application April 16, 1949, Serial No. 87,859

1 Claim. (Cl. 198—196)

This invention relates to an endless belt conveyor, and one object of the invention is to provide improved means for driving such a conveyor.

A further object of the invention is to provide a conveyor comprising a belt having a plurality of flexibly connected sections in which driving force is exerted simultaneously on a plurality of individual sections.

A further object of the invention is to provide such a conveyor in which each belt section is provided with one or more driving elements arranged to be successively engaged and actuated by a power operated driving element.

A further object of the invention is to provide such a conveyor with simple and efficient means for flexibly connecting adjacent belt sections one with the other.

A further object of the invention is to provide such a conveyor in which the several belt sections are positively guided in a substantially straight path.

Other objects of the invention may appear as the apparatus is described in detail.

In the accompanying drawings Fig. 1 is a side elevation, partly broken away, of a conveyor embodying the invention; Fig. 2 is a perspective view of the discharge portion of the conveyor; Fig. 3 is a perspective view of a part of the upper stretch of the conveyor belt and its supporting structure looking upwardly from one side of the conveyor; Fig. 4 is a sectional view taken transversely of the conveyor and showing one of the upright frame members in elevation and partly broken away; Fig. 5 is a side elevation of one of the belt sections, with one of the track rollers broken away; Fig. 6 is a section taken on the line 6—6 of Fig. 5; Fig. 7 is a detail view of one of the flexible connecting devices, partly in section; Fig. 8 is an end elevation of one of the flexible connecting devices; Fig. 9 is a side elevation of the power operated driving mechanism, partly broken away; Fig. 10 is a section taken on the line 10—10 of Fig. 9; Fig. 11 is a side elevation, partly broken away, of the adjustable belt supporting pulley and its adjusting device; and Fig. 12 is a sectional view of the adjustable pulley.

In these drawings I have illustrated one embodiment of the invention and have shown the same as adapted for conveying commodities of various kinds, but it is to be understood that the conveyor as a whole, as well as the several parts thereof, may take various forms and may be assembled in various ways without departing from the spirit of the invention.

In the embodiment here illustrated the conveyor comprises an elongate relatively narrow frame including a longitudinal series of upright frame members or standards 15 which are connected one with the other by upper laterally spaced longitudinal frame members 16 and by lower longitudinal frame members 17. Pulleys 18 and 19 are rotatably mounted on the respective end portions of the main frame. A track extends lengthwise of the upper portion of the frame and is here shown as comprising track members 20 secured to and extending inwardly from the lower portions of the respective frame members 16. An endless conveyor belt 21 extends lengthwise of the frame and about the pulleys 18 and 19 and comprises a plurality of sections 22 flexibly connected one with the other, the sections in the upper stretch of the belt being movably supported on the upper track members 20, and preferably the sections in the lower stretch of the belt are supported in inverted positions on lower track members 23 extending lengthwise of the frame.

In the arrangement shown each section of the belt comprises a load supporting member 24 which is curved about an axis extending lengthwise of the belt to better retain the commodities thereon. Rigidly connected with the lower side of the load supporting member are two brackets 25 on which are mounted rollers 26 which in turn are supported on the respective track members 20. Preferably the load supporting member 24 is reinforced by a plate 27 rigidly secured to the lower side thereof, as by welding, and the brackets 25 are rigidly secured to this reinforcing plate. The load supporting member is provided with one or more driving elements, which are here shown as narrow plates 28 rigidly secured at their upper ends to the supporting member, as by welding, and extending downwardly therefrom. In the arrangement shown each load supporting member is provided with two such driving elements spaced one from the other lengthwise of the belt. The two driving elements are rigidly connected one with the other by longitudinal bars 29 secured to the lateral edges of the plates adjacent the upper ends thereof and lower longitudinal bars 30 secured to the lateral edges of the elements and spaced from the upper bars 29. The terms "upper" and "lower" are herein used with reference to those sections which are in the upper stretch of the belt, it being obvious that in the lower stretch of the belt the sections are supported in inverted positions.

A driving mechanism is mounted on the main frame below the upper stretch of the belt and is provided with a driving element having parts to engage the successive driving elements on the belt and thus impart continuous longitudinal movement to the belt. This driving element may be of any suitable character. In the present instance it comprises two laterally spaced sprocket chains 31 each of which is mounted on sprocket wheels 32 carried by shafts 33 and 34 mounted in a supplemental frame 35, which in turn is mounted on the main frame. Cross members are spported by and extend between the two sprocket chains and are here shown as rods 36, each of which extends through the bearings of adjacent links of the respective sprocket chains and constitutes the pivot pins therefor. Preferably a sleeve 37 is rotatably mounted on each rod. The upper stretch of this endless driving element is so arranged with relation to the upper stretch of the load supporting belt that each cross member thereof engages one of the driving elements 28 of the belt sections as it moves upwardly to its horizontal position. The cross member remains in engagement with the driving element 28 throughout its horizontal travel and there are a sufficient number of cross-members in the upper stretch of the endless driving element to engage a plurality of driving elements 28. Thus the driving force is applied simultaneously to a plurality of individual sections and is distributed throughout a substantial portion of the length of the upper stretch of the conveyor belt. The endless driving element may be driven from any suitable source of power, but preferably an electric motor 38 is mounted on a supplemental frame 35 and drivingly connected with one of the shafts of the driving mechanism, in the present instance the shaft 34. To counteract any upward thrust which may be exerted on the driving elements 28 as they are engaged by the cross members a guard plate 61 extends above the track rollers 26 along that portion of the belt which is immediately adjacent the endless driving element, the guards being in the present instance secured to the upper edge portions of the two longitudinal frame members 16.

The flexible connection between adjacent sections of the belt may take various forms but preferably it comprises a flexible element 39, such as a short section of steel cable, which is connected at its ends with the adjacent driving elements of two adjacent sections of the belt, the length of the flexible element being such as to properly space said sections one from the other. This flexible member may be connected with the driving elements in any suitable manner but the connection shown in Figs. 7 and 8 is simple and efficient in character and enables the adjacent sections to be easily connected one with the other, and the connecting elements can be easily removed and replaced in case of failure. As shown more particularly in Fig. 7 each driving element 28 is provided with an opening 40 the upper portion 41 of which is here shown as of a diameter substantially greater than the diameter of the lower portion 42 thereof, the two portions of the opening being in open communication one with the other. The ends of the cable section 39 extend into the lower portions 42 of the respective openings and mounted on each end of the cable is a bushing 43 the inner portion 44 of which is cylindrical and fits snugly about the cable, and the outer portion 45 of which is flared outwardly. The cable is secured in the bushing by expanding the same in the flared end of the bushing, as by driving a tapered pin 46 into the end of the cable and brasing or otherwise securing the same in the cable, as shown at 47. The outer flared end portion of the bushing is provided with an external flange 48 which engages an outer surface of the driving element about the lower portion of the opening, the driving element being here shown as provided with a recess 49 to receive the flange. That portion of the bushing 50 which is adjacent the flange fits snugly in the lower portion 42 of the opening and the inner portion of the bushing, which extends inwardly beyond the driving element, is provided with an external screw thread 51 to receive a nut 52 by which the bushing may be clamped tightly to the driving element, a washer 53 being preferably interposed between the nut and the guide element. In connecting two driving elements one with the other a bushing 43 is mounted on one end of the cable section and rigidly secured thereto, the nuts and washers being omitted. With the one bushing secured to the cable the latter is inserted through one of the driving elements from the outer side thereof, and the two washers and nuts are then slipped onto the cable and the second bushing is secured to the other end of the cable. The flange 48 of the bushing is of such diameter that it may pass through the upper part 41 of the opening in the last mentioned driving element and the threaded portion of the bushing moved downwardly into the lower portion of the opening. When the bushing has been so positioned the driving element and the cable are moved relatively one to the other to properly seat the flange 48 of the last mentioned bushing in the recess 49 and the washers and nuts are then mounted about the threaded inner ends of the bushings and the nuts tightened down to firmly clamp the bushings to the respective driving elements.

The belt sections are positively guided in a substantially straight path and for this purpose the upper portion of the frame is provided with two laterally spaced longitudinal guide bars 54 which in the present instance are secured to upwardly extending parts 55 of cross bars 56 which form parts of the respective upright frame members or standards 15. Each belt section is provided with a part arranged between and cooperating with the guide bars 54 and this part is preferably carried by the driving elements 28. In the arrangement here shown a roller 57 is mounted on the driving elements for rotation about a vertical axis and is arranged between the guide bars 54. The roller is of a diameter slightly less than the distance between the two guide bars to prevent the roller from simultaneously engaging both bars. The roller may be mounted on the driving elements in any suitable manner, as by securing cross bars or plates 58 and 59 respectively to the upper and lower longitudinal bars 29 and 30, which connect the two driving elements one with the other. The cross bars 58 and 59 are thus spaced apart to receive the roller 57 between them, the roller being mounted on a pivot pin, such as a bolt 60 extending through the plates 58 and 59.

To maintain the belt taut it is desirable that one of the belt supporting pulleys should be adjustable lengthwise of the frame. For this purpose the pulley 18 is rotatably mounted on the end portion of a supporting structure or frame 62 which is mounted on the main frame for movement lengthwise of the latter and is held against tilting movement, as by mounting the same between two pairs of rollers 63 and 64. A lever 65 is pivotally mounted between its ends on the frame, on an axis 66 which, in the arrangement shown, is located beneath the inner portion of the supporting structure 62. The upper end of the lever 62 is connected with the inner end portion of the supporting structure by a link 67 and an expansion spring 68 is connected at one end with the lower end of the lever 65 and at its other end with the fixed part 69 of the frame. The spring is maintained under tension so that the supporting structure 62 and the pulley carried thereby are constantly urged in a direction to tighten the belt.

The pulleys 18 and 19 may be of any suitable character but inasmuch as the driving elements 28 extend below the track engaging rollers 26, it is desirable that each pulley should be provided with a circumferential central groove 70 to receive the end portions of the driving elements and permit the belt sections to move freely about the pulleys. Guides may be provided to retain the sections on the pulleys and as shown in Fig. 12 the adjustable pulley 18 is provided at each edge with a radial flange 71 to retain the rollers thereon. The belt sections as they pass about the non-adjustable pulley 19 are guided by guide flanges 72 on the end portion of the main frame so that the rollers 26 pass from the track members 20 onto the guides 72 and then onto the lower track members 23 with the load supporting members facing downwardly.

It is sometimes desirable that the commodity carried by the conveyor belt should be discharged therefrom automatically onto a platform or a second conveyor. For this purpose one of the upper longitudinal frame members 16 is provided adjacent the discharge end of the conveyor with a depressed portion 16a and the track members carried by that frame member are likewise depressed. Thus as each belt section approaches the discharge point that side thereof adjacent the depressed frame member moves downwardly and the section as a whole is tilted to discharge the commodity therefrom onto a second commodity receiving structure.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

A conveyor comprising an elongate frame, laterally spaced track members supported by and extending lengthwise of said frame, pulleys rotatably supported adjacent the respective ends of said frame, a load supporting belt extending about said pulleys and comprising a plurality of load supporting members movably supported on said track members, rigid elements secured to and depending from the respective load supporting members and each having an opening therethrough, means for flexibly connecting depending elements of adjacent load supporting members, each such means including a second of cable, bushings on the respective ends of said cable and mounted in the respective openings, each bushing having a flared outer end portion, a flange on said flared end portion to engage the depending element, said bushing also having a portion fitting in said opening and an externally screw threaded inner end portion, means to expand the end of said cable in the flared portion of said bushing, and a nut on said threaded portion of said bushing to draw said flange into tight engagement with said depending element, said opening having an enlarged upper portion through which the flanged end of said bushing may pass, and means for actuating said belt.

THEODORE R. BLACK.

References Cited in the file of this patent

UNITED STATES PATENTS

| Number | Name | Date |
|---|---|---|
| 811,991 | Acklin | Feb. 6, 1906 |
| 812,374 | Smead | Feb. 13, 1906 |
| 906,858 | Blum | Dec. 15, 1908 |
| 1,495,845 | Lakin | June 24, 1924 |
| 1,785,141 | Morton | Dec. 16, 1930 |
| 1,883,007 | Sheel | Oct. 18, 1932 |
| 1,911,525 | Neuman | May 30, 1933 |
| 1,973,005 | Lemmon | Sept. 11, 1934 |
| 2,162,419 | Bryan | June 13, 1938 |
| 2,257,758 | Murch | Oct. 7, 1941 |
| 2,333,926 | Hapman | Nov. 9, 1943 |